United States Patent [19]

Kleinhans

[11] 4,219,091
[45] Aug. 26, 1980

[54] TRANSDUCER MOUNTING
[75] Inventor: Robert J. Kleinhans, Canton, Mass.
[73] Assignee: Bofors America, Inc., Edison, N.J.
[21] Appl. No.: 954,914
[22] Filed: Oct. 26, 1978
[51] Int. Cl.² ............................................. G01G 21/08
[52] U.S. Cl. .................................... 177/211; 177/255; 177/DIG. 9
[58] Field of Search ............... 177/211, 255, 132, 133, 177/134, DIG. 9, 244

[56] References Cited
U.S. PATENT DOCUMENTS

| | | | |
|---|---|---|---|
| 3,736,998 | 6/1973 | Flinth | 177/255 X |
| 3,741,328 | 6/1973 | Andersson | 177/DIG. 9 |
| 3,935,914 | 2/1976 | Nordstrom | 177/211 X |
| 4,066,140 | 1/1978 | Conley | 177/255 |

Primary Examiner—Joseph W. Hartary
Attorney, Agent, or Firm—James E. Mrose

[57] ABSTRACT

Strain-gaged transducers sensing weight of a storage tank in an electronic weighing system also provide the sole structural suspension for the tank upon its underlying support. The transducers are arrayed about a position which is central to the tank, and each is mechanically linked with it via a height-adjustable lateral-expansion assembly including a clevis with its horizontal shaft slidable longitudinally along an axis aimed at the center position and with universal jointing about mutually-perpendicular axes. Misalignments and expansions are accommodated, without impairing accuracy of weight measurements.

8 Claims, 5 Drawing Figures

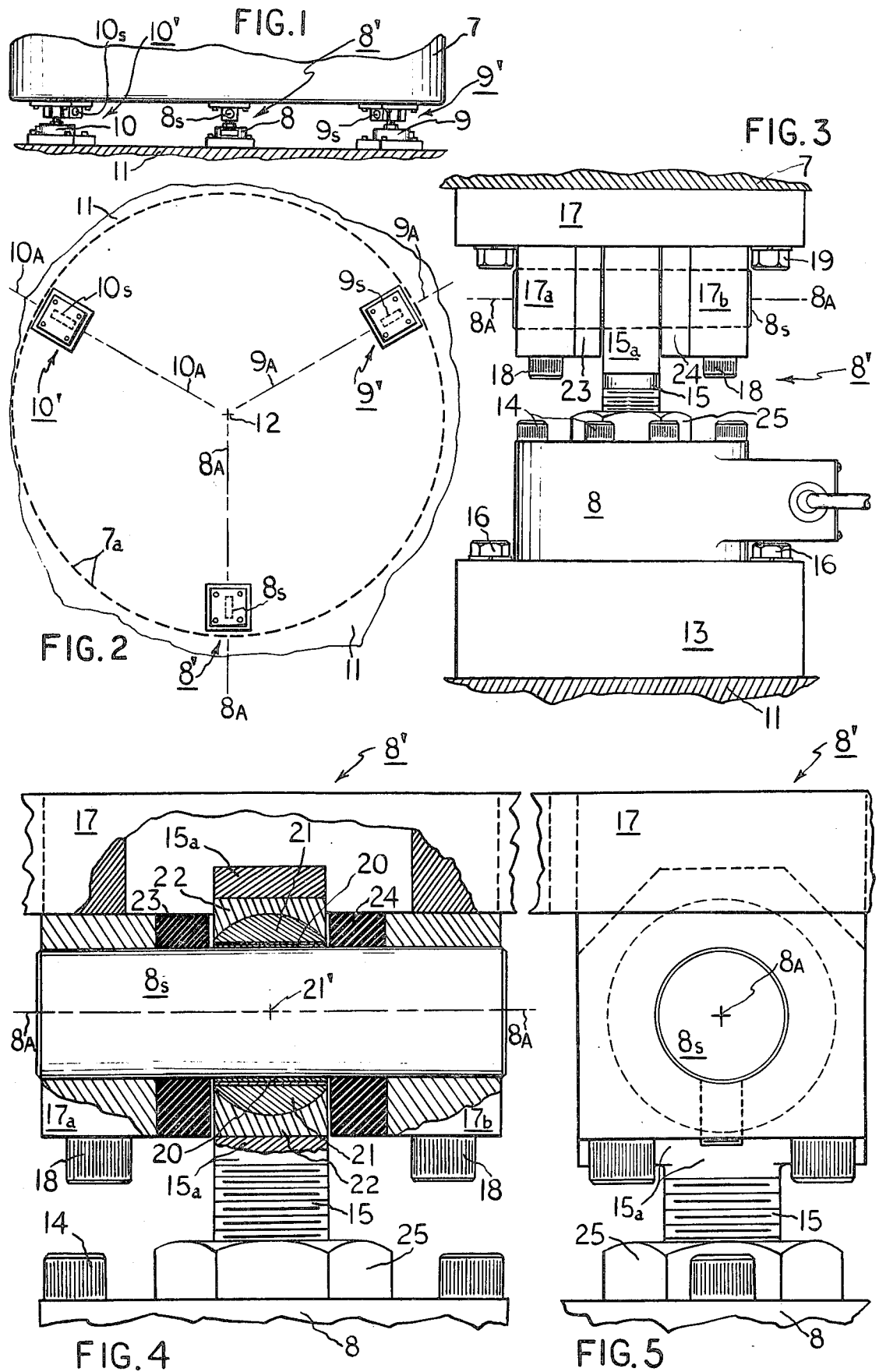

4,219,091

TRANSDUCER MOUNTING

BACKGROUND OF THE INVENTION

The present invention relates to improvements in electronic weighing systems of the type wherein plural strain-gaged transducers sense the weight of containers, such as hoppers or tanks, and produce related electrical output signals which can be electronically translated into displays of content weight or weight changes or into automatic control of filling, batching, blending, or the like. In one particular aspect, batch weighing-system accuracy and the mountings of associated weight-responsive transducers are improved by unique combinations wherein rugged adjustable clevis-jointed expansion units are distinctively aligned and swivelled to couple all loading vertically through sensing cells notwithstanding environmentally-induced distortions which tend to develop errors.

As is well known in the art, various forms of transducer devices, or load cells, equipped with electrical strain gages may be used to characterize weights supported by a platform or container. Such cells generally perform best when they experience loadings closely aligned with a predetermined measurement axis, and all such loadings should be substantially vertical and unshunted by other mounting structure if measurement accuracy is to be maintained. For the latter purposes, it has been proposed that a weighed tank be supported on a number of shaped legs which are themselves directly gaged to represent the vertical forces, and that the legs be terminated in ball feet which may act as bearings (U.S. Pat. No. 2,597,751—Ruge). The need to avoid by-passing effects of stays, guides, check plates and the like, if measurements are to be precise, has further been taken into account in U.S. Pat. No. 3,439,761—Laimins, where transducer-supports of a parallelogram type were described as promoting wholly vertical platform deflections. Although a load cell may be made inherently highly immune to side, eccentric and angular loadings (U.S. Pat. No. 3,037,178—Pien), one should nevertheless provide that such unwanted forces will not exceed prudent limits and that optimum performance will be favored by application of the weight-responsive forces along a preferred cell axis under all expected conditions of use. U.S. Pat. No. 3,565,196—Laimins discusses the use of such cells with a weighing platform, and makes it clear that auxiliary adjustments and isolations from non-vertical and spurious loadings can be important to precision weighing even with such transducers. Automatic display and control in response to load-cell weighing are well known and may vary with the applications; U.S. Pat. No. 3,708,026—Senour, provides one example of advanced concepts associated with such electronic weighing systems.

Particular difficulty is experienced when the supported object is large and its weight relatively great and there are extremes of environmental conditions, such as widely-different seasonal temperatures. In those cases, the cells can be exposed to serious disturbing forces, and any mechanisms designed to relieve such forces must not only be sensitive but must themselves be strong and reliable; further, they should not add unreasonably to related costs of manufacture and installation of the weighing system.

SUMMARY OF THE INVENTION

By way of a summary account of underlying recognitions and of preferred practice of this invention in one of its aspects, an advantageous tank-weighing system lending itself to precision operation under diverse environmental conditions and involving rugged and uncomplicated structure is realized through use of a plurality of shear load cells each connected between the tank base and an underlying support by means of a slidable and universally-jointed clevis unit having its pin shaft aligned with a common center point of the cell array. The yoke or shackle for each pin shaft is affixed to the underside of the tank, with the shaft in the prescribed horizontal alignment, and the upper end of a sheartype low-profile load cell is threadedly coupled with an upwardly-extended support member carrying a sleeve bearing mated about the pin shaft for relative sliding movement. The sleeve bearing also has a limited universal jointing in its support member, formed by mating spherical surfaces of convex and concave elements of the joint, centered with the same horizontal axis along which the sliding motion is accommodated.

It is one of the objects of the present invention, therefore, to provide unique and improved transducer-mounted electrical weighing apparatus in which transducers cooperatively supporting a weighing structure are isolated from effects of non-vertical loadings and lateral expansions by clevis-type universal couplings affording sliding freedom along non-aligned horizontal axes.

Another object is to provide novel and advantageous expansion-joint universal couplings for the load-cell mounting of tanks and the like which experience environmentally-induced dimensional changes, and to provide for distinctive arraying of the cells to both allow lateral expansion without impairing measurement accuracy and yet avoid lateral instability without resort to weight-shunting stays.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 provides a pictorial side view of the lower part of a storage tank with an improved transducer-mounting array interposed between it and an underlying support;

FIG. 2 is a plan view of the transducer-mounting array of FIG. 1, less the storage tank;

FIG. 3 portrays one of the transducers and associated mounting provisions from among those of FIGS. 1 and 2;

FIG. 4 illustrates details of the mounting provisions of FIG. 3, with portions being cross-sectioned to expose internal structural relationships; and FIG. 5 supplies an end view of the mounting provisions appearing in FIG. 4.

DETAILED DESCRIPTION OF THE PREFERRED EMBODIMENTS

Having reference to the drawings, wherein like reference characters designate identical or corresponding components and units throughout the several views, and more particularly to FIG. 1 thereof, one embodiment of an improved electrical weighing system is shown to include a container, in the form of a storage tank, 7, for material the weight of which is to be sensed and displayed and/or utilized to initiate control. For the latter purposes, several low-profile shear-type load cells, 8-10, are interposed between the underside of the tank and its foundation or other support structrure, 11, and, in accordance with established practices, the electrical characterizations of vertical forces by electrical-resistance strain gages within the cells may be translated into weight-related electrical signals and into display and/or control by known means (not illustrated) which need not be basically altered to serve such a system. Each load cell is part of an assembly, 8'-10', wherein it is sandwiched between upper and lower mounting plates, along with a special coupling which affords the needed mechanical connections, adjustment, and freedoms for sliding and tilting movements. As is portrayed in FIG. 2, the three assemblies 8'-10' are preferably equi-angularly spaced in an array about a common center point, 12, at about the same radial distance from it and near the outer periphery of the tank, the latter being designated by dashed linework 7a in FIG. 2. In each instance, the coupling by which the load cell of one of the assemblies 8'-10' is connected in load-supporting and weight-measuring relation to tank 7 includes a short shaft along which some relative sliding motion can take place; those three shafts are identified as 8s-10s, respectively, and double-dashed linework 8A, 9A and 10A in FIG. 2 characterizes the fact that the horizontal longitudinal axes of these shafts are aligned with and intersect at the center point 12. The latter point is selected to be at about a center of lateral expansion of the bottom of the tank, such that thermally-induced dimensional changes will result in about equal expansions radially along the axes 8A-10A. Those expansions are accommodated by low-friction sliding movements which may occur along the shafts 8s-10s, and the load cells are thereby isolated from expansion-related forces which could otherwise prove to be troublesome. At the same time, the angled relationships of the axes along which sliding may occur produce the further highly desirable result that other lateral movements, as well as angular movements, are suppressed, without involving any external stay rods and check rods which could by-pass some of the weight-related forces and thereby lead to significant measurement error. Such stay or check rods or like auxiliary restraints may also be of relatively costly and intricate construction, inasmuch as their designs usually call for stiffness in certain directions but not others, and their installations in the field can involve substantial expense connected with welding, mounting of special fittings, and so forth.

Expansion problems, to which the sliding but self-locking array of shafts is addressed, can be seen to be of some consequence by considering the case of a six-foot diameter stainless-steel tank which may typically experience seasonal temperature changes from −30° F. to 100° F. Increase, X, in tank diameter, may be expressed as:

$$X = dT \times a \times D$$

where
X = diameter increase, in inches
a = thermal coefficient of expansion ($9 \times 10^{-6}$ inch/inch, for stainless steel)
D = tank diameter, in inches
dT = temperature variation, in °F.
or, $$X = 130 \times 9 \times 10^{-6} \times 72 = 0.084 \text{ inch}$$

Slippages along shaft axes 8A-10A allow for the motion attending such expansion, without involving other looseness which would be intolerable in a rugged highly-loaded structure.

FIG. 3 includes illustration of one of the load cells, 8, which is preferably of the low-profile shear-responsive type disclosed in the aforesaid U.S. Pat. No. 3,037,178—Pien, and which is known to have concentric rigid inner and outer portions, the latter of which may be securely fastened to a stiff load plate 13 by bolts 14 and the former of which is internally threaded to accept the externally-threaded upright bearing-support member 15 through which measured loading forces are transmitted downwardly from tank 7 and thence through the load cell and its load plate 13 to the underlying support structure 11 to which it is secured via bolts 16. At its upper end, 15a, support member 15 carries a bearing unit in a sleeved and longitudinally-slidable relationship to the short horizontally-disposed shaft 8 having its longitudinal axis 8A-8A aimed at the aforesaid center position 12. That shaft is held fixedly in the aligned position by the two spaced clevis-type yoke or shackle members 17a and 17b, both of which are securely fastened to the underside of upper loading plate 17 by bolts 18. Plate 17 is in turn attached to the tank 7 by suitable provisions, such as bolting 19.

The bearing unit incorporated into the enlarged upper end 15a of upright bearing-support member 15 has a central cylindrical opening lined by a thin bearing sleeve 20 (FIG. 4) of high-lubricity material, such as polytetrafluoroethylene, which facilitates axial sliding of the shaft 8s in relation to it as dictated by effects of expansion and contraction but otherwise forms a precise fit which avoids unwanted looseness in the tank mounting. That sleeve is in turn surrounded by a spherically-convex or ball member, 21, which is socketed within a spherically-concave or socket member 22, the latter being held within end 15a and being assembled into place from split halves, for example. The ball-and-socket or universal jointing thus formed will accommodate minor misalignments and other small dimensional variations which may be encountered, the resulting small movements about the ball-and-socketing center 21' thereby avoiding the imposition of spurious and error-inducing forces upon load cell 8. Annular sponge-rubber members 23 and 24 around shaft 8s are interposed to fill tolerance spaces between the yoke parts 17a and 17b and the bearing unit between them, and keep the more critical portions of the coupling free of contaminations while permitting any needed relative motions and while themselves avoiding the introduction of any significant forces. Externally-threaded upright member 15 cooperates with a jam nut 25 which amy be loosened and re-tightened to allow relative turning motion and a shim-less height adjustment between the cell and the clevis assembly by which it is coupled to the tank; this enables the entire assembly to be increased or diminished in heights, as need arises, to maintain levelling of the tank and, in particular, to preserve desirable equal distributions of the load among four or more transducers.

Although the illustrated embodiment involves a shaft 8s which is fixed with the supported tank and has a slidable connection with the bearing member 15a, the arrangement may be reversed with useful results. That is, the shaft 8s may be axially fixed in its transverse relation to upright member 15a, with high-lubricity or equivalent sleeve-bearing provisions being present in the clevis arms 17a and 17b to accommodate the intended sliding in directions of axis 8A—8A as significant expansions and contractions occur. For purposes of other desirable freedoms for movement at the upper extremity of member 15a, the axially-fixed shaft is then preferably equipped with an integral or otherwise immovable shoulder having a convex spherical contouring, like that of ball member 21, to develop the advantageous ball-and-socket coupling, and, in any event, bearing provisions for relative rotation about axis 8A—8A will be found to be beneficial. In other expressions, an entire assembly of transducer and coupling could be inverted, with the transducer at the top, for example. Further, the improved couplings and arrays of couplings may involve transducers or cells other than that specifically shown and described, with expectation of like advantages.

In some instances it may not be necessary that all of the transducer mounting assemblies be equipped with the slidable couplings as described. For example, when three such mountings are used in an array like that of FIG. 2, one may lack such a coupling while the other two include such sliding provisions, angled to respond to expansions and contractions along two axes which cross at a position whence those dimensional changes may be taken to radiate. And, more than three such mounting assemblies may be used, as the application may warrant.

Accordingly, it should be understood that the specific practices and preferred embodiments herein referred to have been offered by way of disclosure, rather than limitation, and that various modifications, additions and substitutions may be effected by those skilled in the art without departure from these teachings or from this invention in its broader aspects and as set forth in the appended claiming.

What I claim as new and desire to assure by Letters Patent of the United States is:

1. Apparatus responsive to weight of a load-carrying structure comprising a plurality of transducers which characterize forces applied substantially vertically between two relatively-deflectable portions thereof, said transducers being disposed between said load-carrying structure and an underlying support in an array of positions angularly spaced about a common position, coupling means for coupling one of the said portions of each of said transducers to said support, and coupling means for coupling the other of the said portions of each of said transducers to said load-carrying structure, one of said coupling means for each of at least two of said transducers including a substantially horizontal shaft having its longitudinal axis aimed at said common position and sleeve bearing means mated about and slidable relative to said shaft, the said shaft and the said sleeve bearing means for each said one of said coupling means being respectively fixed with one of said portions of one of said transducers and with one of said structure and support and thereby preventing relative lateral movement therebetween in relation to said longitudinal axis, whereby said coupling means including said relatively-slidable shaft and bearing means transmit weight-related vertical forces through said transducers and yet allow expansions and contractions to slide said coupling means along the longitudinal axes of the shafts thereof without imposing significant related forces on said transducers and at the same time, together with said transducers, lock said structure and support against other relative lateral and angular movements without any by-passing of forces through auxiliary stay rods and the like.

2. Apparatus responsive to weight as set forth in claim 1 wherein said transducers are at least three in number and are in substantially equi-angular array about and at substantially equal radial distances from said common position, said common position being aligned with substantially the center of said load-carrying structure, and wherein each of said transducers includes electrical strain gage means responsive to force-induced deformations of sensing element material between said relatively-deformable portions, and wherein said support and the array of transducers are substantially horizontal.

3. Apparatus responsive to weight as set forth in claim 2 wherein each said one of said coupling means has freedom for relative angular movement between said shaft and said sleeve bearing means about the longitudinal axis of said shaft.

4. Apparatus responsive to weight as set forth in claim 1 wherein each of said one of said coupling means further includes means forming at least a limited-freedom ball-and-socket type connection between said one of said portions of one of said transducers and said one of said structure and support, the center of said ball-and-socket type connection lying substantially along said axis of said shaft.

5. A transducer mounting assembly for responding to weight-related forces imposed by a load-carrying structure upon an underlying support at one of a plurality of laterally-spaced positions about a common position, comprising a weighing transducer for producing weight-related output signals characterizing vertical forces transmitted between two relatively-deflectable portions thereof, means for attaching one of said portions substantially immovably with one of the structure and support, and clevis-type coupling means having a shackle with pair of spaced clevis arms and a pin shaft extending therebetween, bearing means mated about said pin shaft between said clevis arms for relative angular movement about said shaft, fastening means for fastening said shackle and said bearing means each with different one of the load-carrying structure and the other of said transducer portions, and sleeve-bearing means in said coupling means accommodating relative sliding movements between said shackle and said bearing along the longitudinal axis of said shaft, said fastening means accommodating the aiming of said axis at substantially said common position.

6. A transducer mounting assembly as set forth in claim 5 wherein said coupling means further includes means forming a ball- and-socket type connection between said shackle and said bearing, the center of said ball-and-socket type connection lying substantially along said axis.

7. A transducer mounting assembly as set forth in claim 5 wherein said transducer includes electrical strain gage means responsive to force-induced deformations of sensing-element material between said relatively-deflectable portions, and wherein said fastening means secures said shackle with the load-carrying structure and said bearing means is fastened with said other of said transducer portions.

8. A transducer mounting assembly as set forth in claim 7 wherein said means for fastening said bearing means with said other of said transducer means includes a threaded connection rotatable about a vertical axis for adjusting the heightwise relationship between said bearing means and said transducer means and, thereby the vertical fit of the mounting assembly between said load-carrying structure and said support.

* * * * *